Nov. 28, 1950      G. H. DAYTON      2,531,557
ROTARY POWER CULTIVATOR
Filed Sept. 19, 1947      3 Sheets—Sheet 1
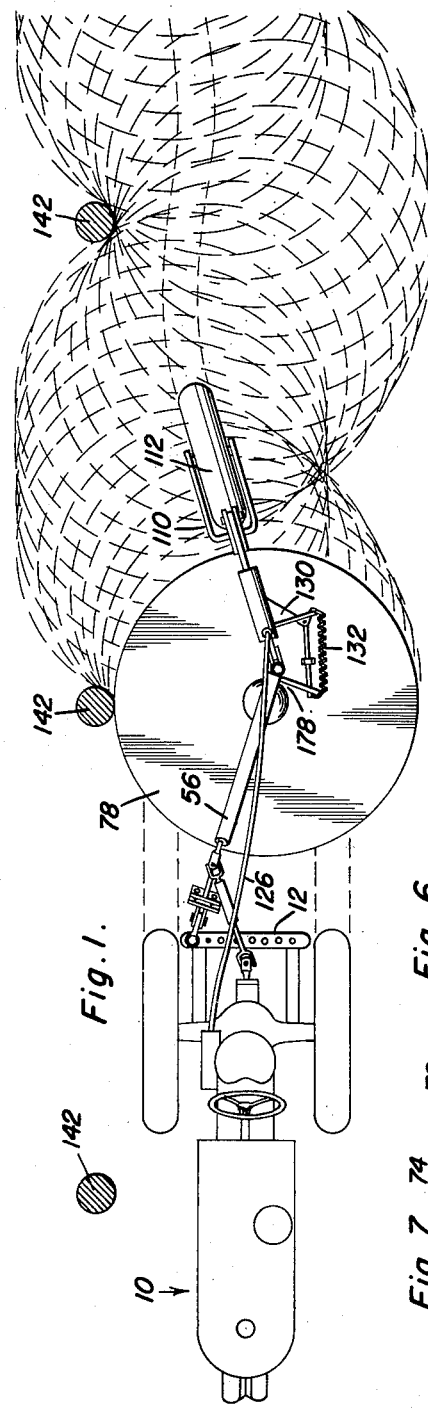
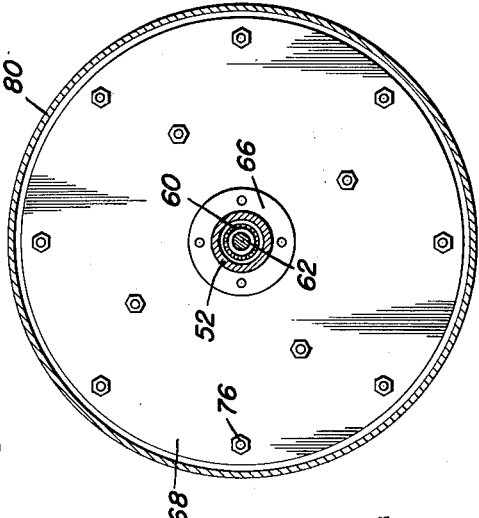
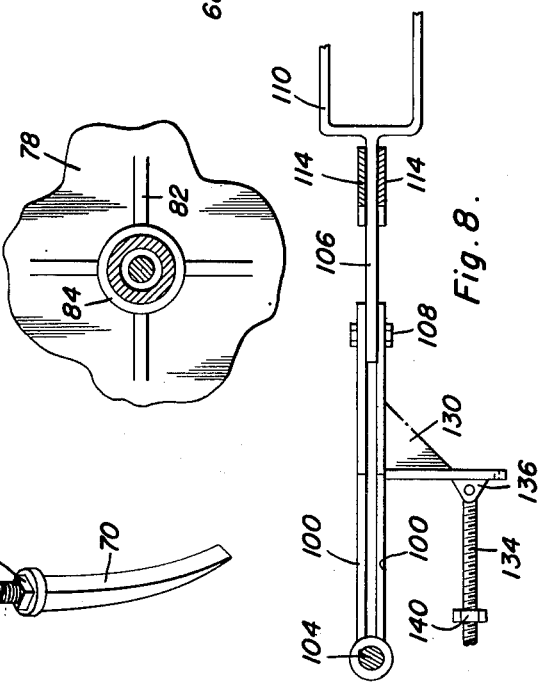
Inventor
Grant Hilton Dayton
By *Clarence A. O'Brien and Harvey B. Jacobson*
Attorneys Nov. 28, 1950  G. H. DAYTON  2,531,557
ROTARY POWER CULTIVATOR
Filed Sept. 19, 1947  3 Sheets-Sheet 2
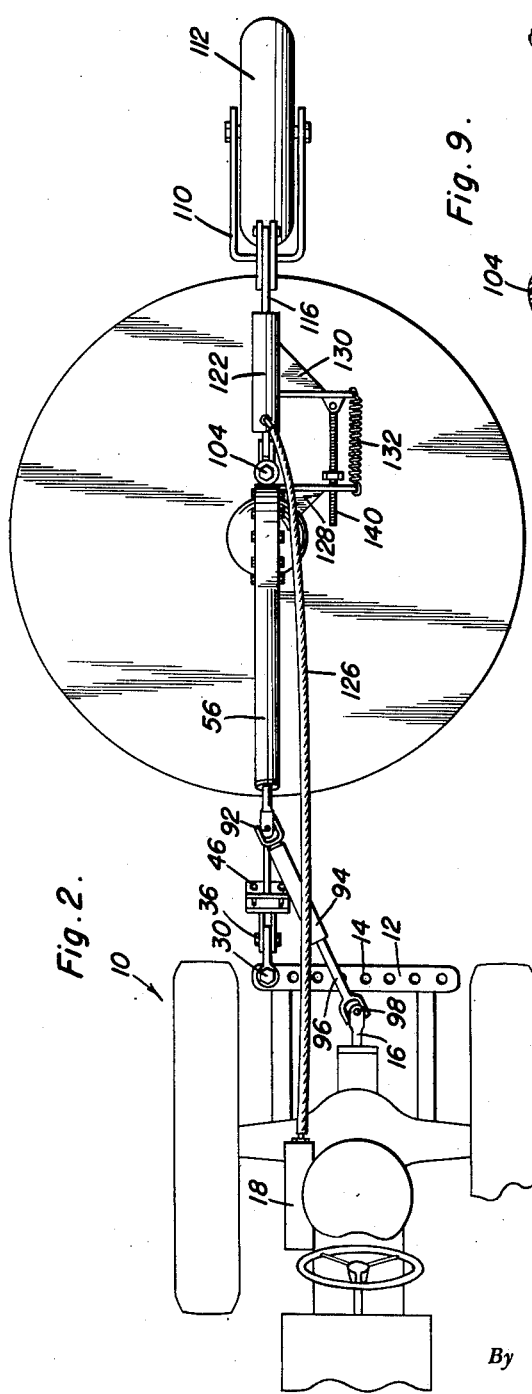
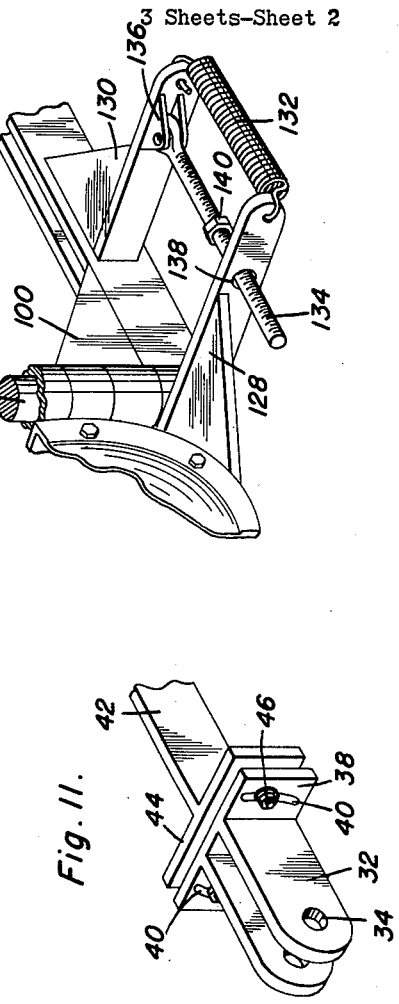
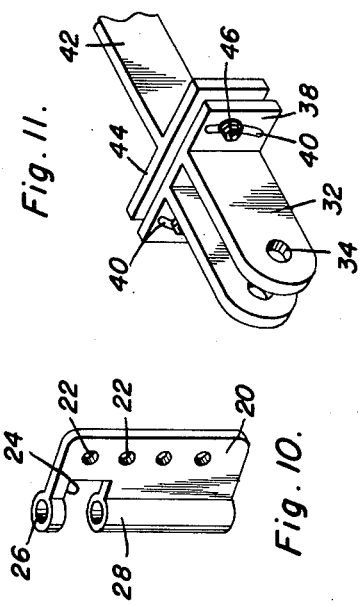
Inventor
Grant Hilton Dayton
By *Clarence A. O'Brien and Harvey B. Jacobson*
Attorneys Nov. 28, 1950   G. H. DAYTON   2,531,557
ROTARY POWER CULTIVATOR
Filed Sept. 19, 1947   3 Sheets-Sheet 3

Inventor
Grant Hilton Dayton

By Clarence A. O'Brien
and Harvey B. Jacobson
Attorneys

Patented Nov. 28, 1950

2,531,557

UNITED STATES PATENT OFFICE 2,531,557

ROTARY POWER CULTIVATOR

Grant Hilton Dayton, Kingsburg, Calif.

Application September 19, 1947, Serial No. 775,110

10 Claims. (Cl. 97—43)

This invention comprises novel and useful improvements in a rotary power cultivator and more specifically pertains to an attachment which may be readily applied to a tractor and operated by the power take-off thereof for cultivating the ground close to and about obstructions.

It is a primary object of the invention to provide a rotary cultivator for working the ground and which will automatically accommodate itself to various obstructions in the line of travel of the device, thereby eliminating the necessity for cross cultivation.

A further object of the invention consists in providing a cultivator in accordance with the foregoing objects which may be readily attached to a tractor and may be operated by the power take-off thereof.

The invention is particularly characterized by the provision of a swivelled rear supporting wheel and a guard frame about the rotary cultivator, whereby engagement of the frame with an obstruction will cause swivelling of the rear wheel and a lateral displacement of the cultivator for working the ground close to and about such an obstruction.

A still further feature of the invention is the provision of power operated means for selectively elevating the cultivator from the ground, such power operated means being energized by the hydraulic system of the tractor.

And a further important feature of the invention resides in an improved construction for rotating the cultivator, together with improved means for detachably connecting the cultivator to a tractor and to a supporting wheel, and with the further provision of resilient means for yieldingly biasing the cultivator into its normal operative position.

These, together with various ancillary objects of the invention which will later become apparent as the following description proceeds, are attained by this device, a preferred embodiment of which has been illustrated by way of example only in the accompanying drawings, wherein:

Figure 1 is a diagrammatic view, in top plan, illustrating the construction of the device and the manner of operating the same, the weaving path of the device in response to engagement with obstacles being indicated by dotted lines;

Figure 2 is an enlarged top plan view of the device attached to a tractor;

Figure 5 is a detail view taken substantially upon the horizontal plane of the section line 5—5 and illustrating the construction of the rotary cultivator head and the guard member therefor;

Figure 6 is a fragmentary detail view taken in horizontal section substantially upon the plane of the section line 6—6 of Figure 4 and illustrating constructional details of the guard member;

Figure 7 is a perspective view of one of the cultivator teeth of the invention;

Figure 8 is a top plan view, taken substantially upon the horizontal plane of the section line 8—8 of Figure 3, and showing the construction of the supporting arm for the rear wheel of the device;

Figure 9 is a fragmentary perspective view showing the supporting arm and the manner of attaching the same to the frame construction of the rotary cultivator;

Figure 10 is a perspective view of the connecting bracket for attaching the device to the drawbar of a tractor; and Figure 11 is a fragmentary detail view showing a swivelling coupling member for attaching the device to the bracket of Figure 10.

Figure 3:
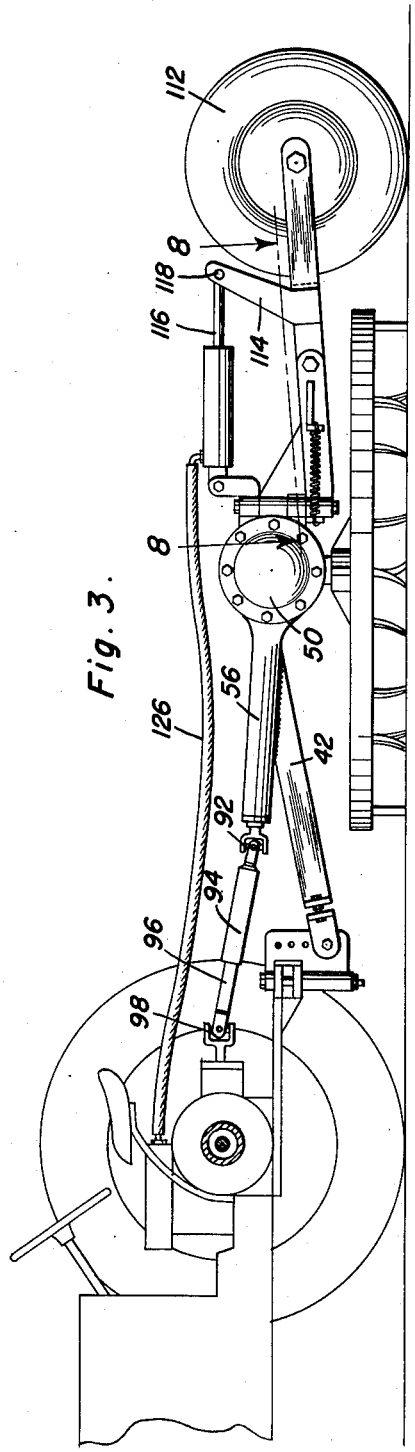
Figure 3 is a side elevational view of the device shown in Figure 2.

Referring now more specifically to the accompanying drawings wherein like numerals designate similar parts throughout the various views, attention is directed first to Figures 2 and 3 wherein there is disclosed a portion of a tractor 10 of any suitable construction but provided with the customary rearwardly extending drawbar connecting plate 12 provided with a plurality of laterally spaced apertures 14 and having a power take-off shaft 16 together with a hydraulic fluid operating means indicated at 18.

Swivelly connected to the drawbar 12 and adjustable laterally thereof by selective engagement with one of the apertures 14 is a bracket consisting of a vertically disposed, rearwardly extending plate 20 having a plurality of vertically spaced transversely extending apertures 22 therein. At its forward edge, plate 20 is rearwardly notched or recessed, as at 24, to loosely straddle the drawbar 12, and is further provided with upper and lower aligned sleeves 26 and 28 detachably receiving a coupling pin 30 or bolt by means of which the bracket 20 may be swivelly connected to the drawbar 12 in laterally adjusted position thereon.

It will thus be seen that the bracket 20 is hinged to the drawbar for horizontal rotation about a vertical axis, and is further provided with vertically spaced apertures for adjustably receiving a vertically pivoting connecting member to be now described.

Referring next to Figures 2 and 11, this connecting member is shown as comprising a pair of forwardly extending parallel arms 32 provided with a transversely disposed aperture means 34 which may be pivotally connected to selected ones of the apertures 22 as by a transverse bolt 36 detachably extending therethrough. At their rear end, the arms 32 are integrally attached to a transversely extending plate 38 whose outer extremities are provided with arcuately disposed slots 40 having as their common center the center of the plate 38.

As shown more clearly in Figure 11, a beam forming a trunk or supporting arm of the device has at its forward end a transversely disposed plate 44 similar to and cooperating with the previously mentioned plate 38, the plate 44 having forwardly extending bolts or fastening means 46 engageable in the arcuate slots 40, whereby the arm 42 may be oscillatably secured to the coupling plate 38 for relative rotary movement therewith.

Figure 4:
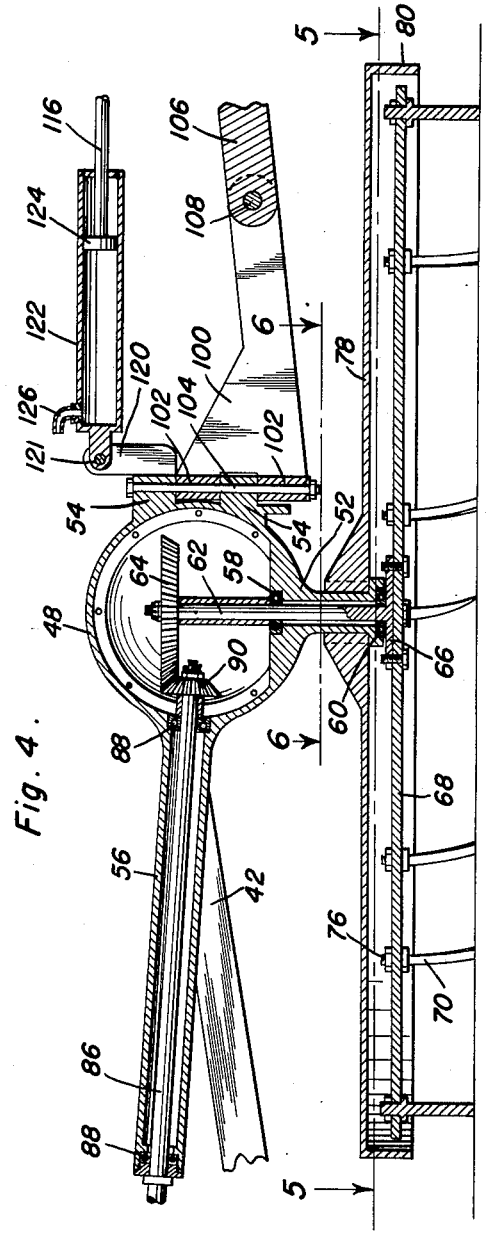
Figure 4 is an enlarged fragmentary detail view of the rotary cultivator and its supporting and associated driving and operating mechanism, and is taken substantially in vertical longitudinal section.

As shown more clearly in Figures 3 and 4, the tongue or beam 42 at its rear end is rigidly or integrally attached to a housing 48 having a removable cover plate 50, which housing is provided with a downwardly extending tubular extension 52, vertically spaced, rearwardly extending lugs or brackets 54, and a forwardly extending integral tubular housing 56.

Journaled in the downwardly extending tubular portion 52, as by bearings 58 and 60, is a vertically disposed axle or shaft 62 having a bevel gear 64 secured to the upper end thereof within the interior of the housing 48. At its lower extremity, the shaft 62 is provided with an integral flange 66 to which is detachably secured an annular plate 68 constituting the head of the rotary cultivator, and to which is detachably secured, preferably in concentric rows, a plurality of cultivator teeth 70 of any suitable type and construction for working the soil, these teeth being detachably secured to the plate 68. This attaching means, as shown in Figure 7, preferably consists of a flanged and shouldered portion 72 upon the upper end of the teeth, which is removably received in a correspondingly shaped aperture extending through the plate 68, while the tooth at its upper extremity is provided with a screw-threaded portion 74 for engagement by a fastening nut 76. As will be seen, the shouldered portion 72 prevents the teeth from turning in their seats in the plate 68.

Supported by and surrounding the tubular extension 52 is a guard member consisting of an annular plate 78 having an annular depending rim 80 adapted to surround and partially enclose the periphery of the rotary plate 68. As shown in Figure 6, the upper surface of the plate 78 of the guard member is provided with a plurality of preferably radially extending webs or ribs 82 constituting reinforcing members and merging into an axial sleeve 84 embracing the exterior of the reduced portion of the tubular extension 52. As will be readily understood, the guard member 78 and its annular depending shielding rim 80 are carried by the casing or housing 48 of the cultivator and may be rotatably or non-rotatably mounted thereon as preferred.

As illustrated in Figure 4, a drive shaft 86 is journaled within the tubular housing 56 in suitable bearings 88, and at its rear extremity is provided with a bevel driving gear 90 in constant mesh with the bevel gear 64 of the vertical axle 62. At its forward end, the driving shaft 86 is connected as by a universal joint 92 with a sleeve or tube 94 having non-rotatable but longitudinally splined or sliding engagement with a stub shaft 96 connected by a universal joint 98 to the above mentioned power take-off unit 16 of the tractor. Thus, as desired, the power take-off of the tractor may be operated to cause rotation of the driving shaft 86, and the vertical axle 62, to thereby cause rotation of the cultivator head 68 and the cultivator teeth 70. By means of the universal connections, it is obvious that vertical and lateral movement may be imparted to the cultivator unit relative to its mounting upon the tractor, without disturbing the driving engagement, by means of the swivelling connection of the members 20, 38 and 44.

Hinged to the rear of the housing 48 between the lugs 54 is a triangular shaped plate 100 having forwardly extending sleeves 102 interdigitated with the lugs 54 and swively connected thereto as by a pin 104. At its rear extremity, the triangular plates 100 which, as shown in Figure 8, are connected to a rearwardly extending arm 106 by means of a transversely disposed pivot pin 108 extending therethrough, whereby the triangular plates 100 are free to swing in a horizontal plane about their vertical pivot 104, while the arm 106 is free to oscillate in a vertical plane about the horizontal pivot pin 108.

At its rear extremity, the arm 106 is provided with a bifurcated portion 110 between which is journaled a wheel 112 constituting a single supporting means for the rear of the power cultivator. As will readily be evident, the wheel, its supporting arm and the triangular plate assembly are free to oscillate laterally about the axis 104, while the power cultivator is free to move vertically upon the axis 108 with respect to the supporting wheel 112.

Adjacent the wheel 112 and the bifurcated portion 110, the supporting arm 106 has rigidly secured thereto vertically extending brackets 114 between whose upper extremities is pivoted the end of a piston connecting rod 116, as at 118.

As shown best in Figure 4, the upper lug 54 of the housing 48 is formed with an upwardly extending pair of brackets 120 between which is pivoted, as at 121, the closed end of a hydraulic cylinder 122 within which is reciprocable a piston 124 connected to the inner end of the piston rod 116.

A suitable hydraulic conduit 126 connects the hydraulic cylinder 122 with the hydraulic operating system 18 of the tractor, whereby the piston 124 may be selectively positioned in either end of the cylinder 122 under the control of the operator of the tractor. As the piston travels within the cylinder 122, the relative distance between the pivot pins 124 and 118 is varied, thus causing a vertical pivoting of the triangular members 100 about their horizontal pivot 108, to thereby raise or lower the housing 48 and the rotary power cultivator carried thereby.

As will be evident, the cultivator head may thus be raised or lowered in order to permit the device to be easily transported and then returned to its operative position as preferred. As will readily be seen, the driving engagement for rotating the rotary cultivator remains unimpaired during this raising and lowering of the implement.

As set forth hereinbefore, the housing 48 and the rotary cultivator carried thereby are freely oscillatable in a horizontal plane about their vertical hinge 30, and in order to resiliently bias the device into its preferred position directly behind the tractor and the point of attachment of the device to the tractor drawbar, there is provided a resilient means illustrated in Figures 2, 8 and 9. This biasing means comprises laterally extending brackets 128 and 130 carried respectively by the housing 48 and the triangular plates 100, the outer extremities of these brackets being resiliently urged together as by a tension spring 132. To prevent undue movement of the brackets toward each other, there is provided a threaded rod 134 pivotally connected to parallel ears 136 on the bracket 130, and loosely extending through an aperture 138 in the bracket 128, a lock nut or adjusting means 140 being threaded upon the rod to thereby limit the movement of the brackets 128 and 130 toward each other.

From the foregoing, it is believed that the operation of the device will now be readily understood. The spring means normally urges the housing 48 and the rear support arm 106 having the wheel 112 into aligned position with each other and the beam 42 by means of which the device is attached to the drawbar of the tractor. Preferably, the rim of the guard shield 80 of the rotary cultivator protrudes laterally from the line of motion of the side of the tractor, as shown in Figure 1, until the same engages an obstruction, as indicated in Figure 1 at 142. As the tractor and attachment move forward, the lateral opposition of the obstruction 142 causes the guard and the power cultivator and housing connected therewith to be swung laterally inwardly of the tractor, about the vertically disposed pivot pin 30, and this, in turn, causes the support rod 106 to be likewise swung laterally about the pivot pin 104 against the opposition of the spring means 132. As soon as the obstruction is passed, the spring restores the part to the normal position shown in Figure 1, whereby the cultivator is caused to work the soil about the obstruction and thereby eliminate the necessity of cross cultivation.

By proper adjustment of the supporting bracket 20 laterally of the drawbar 12, the cultivator attachment may be caused to assume any position desired with respect to the longitudinal axis of the tractor, while the universal joint connections 98 and 92, with a longitudinally sliding driving connection between members 94 and 96, the vertically hinged connection of the beam 42 upon the supporting or attaching bracket 20, as well as the relative twisting motion permitted between the beam 42 and the connecting plate 38 by means of the arcuate slots 40, all contribute toward permitting the device to thoroughly cultivate the ground even though passing over irregular terrain.

From the foregoing, it is believed that the manner of operating and constructing the device will now be readily understood. Since numerous modifications of the principles of the invention will readily occur to those skilled in the art after a consideration of the foregoing specification and accompanying drawings, it is not intended to limit the invention to the exact construction shown and described, but all suitable modifications and equivalents may be resorted to falling within the scope of the appended claims.

Having described the invention, what is claimed as new is:

1. A rotary cultivator including a housing, a vertical shaft journaled in said housing, a rotary cultivator on said shaft, a guard mounted on said housing and completely surrounding said cultivator, means for hinging said housing to a tractor, a support wheel hinged to said housing and means for driving said shaft from the power take-off of a tractor, said cultivator being laterally displaced upon engagement of the guard with an obstacle for working the ground close to and about an obstacle.

2. The combination of claim 1 wherein said wheel is journaled on a support arm, said arm being hinged to said housing for movement in a horizontal plane and further means for effecting vertical pivotal movement of said wheel relative to said housing including resilient means for biasing said support arm laterally of said housing and stop means limiting said biasing means.

3. The combination of claim 2 wherein said arm and said housing are provided with laterally extending brackets, a spring secured to the outer ends of said brackets and a rod pivoted to one bracket and slidable through the other bracket and an adjusting nut on said rod comprising an adjustable abutment for said other bracket.

4. The combination of claim 1 wherein said housing includes a beam secured thereto, a swivelling connection on said beam, a pivotal connection secured to said swivelling connection and fastening hinges secured to said pivotal connection and to the drawbar of a tractor.

5. The combination of claim 1, including means for securing said housing to the drawbar of a tractor, said means providing for horizontal, vertical and twisting movement of said housing with respect to said tractor and driving means connecting said vertical shaft to the power take-off of a tractor, said last means including a drive shaft journaled in a forward extension of said housing, said drive shaft being geared to said vertical shaft and a longitudinally extensible connection between said drive shaft and said power take-off.

6. In a farm implement including a housing, a vertical shaft journaled in said housing, a rotary cultivator head on said shaft and a wheel mounting swiveled to said housing and supporting a wheel; a guard frame about the rotary cultivator head for contacting an obstacle to effect a swivelling of the wheel and a lateral displacement of the cultivator for working the ground close to and about an obstacle.

7. A farm implement comprising a housing, a vertical shaft journaled in said housing, a rotary cultivator head on said shaft, a tubular arm projecting from the housing, a brace arm fixed to said tubular arm, means swingably and adjustably securing said brace arm to the drawbar of a tractor for vertical and horizontal swinging movement of the housing, a drive shaft mounted in said tubular arm for rotation, a drive connection between said drive shaft and said vertical shaft, means operatively connecting the drive shaft to the power take-off of a tractor, a tubular extension depending from the housing, an annular guard plate carried by said tubular extension and having a depending rim embracing the cultivator head, a wheel mounting swiveled to the housing, and a rear wheel carried by said wheel mounting, said cultivator head being laterally displaced upon engagement of said rim with an obstacle.

8. A farm implement comprising a housing, a vertical shaft journaled in said housing, a rotary cultivator head on said shaft, a tubular arm projecting from the housing, a brace arm fixed to said tubular arm, means swingably and adjustably securing said brace arm to the drawbar of a tractor for vertical and horizontal swinging movement of the housing, a drive shaft mounted in said tubular arm for rotation, a drive connection between said drive shaft and said vertical shaft, means operatively connecting the drive shaft to the power take-off of a tractor, a tubular extension depending from the housing, an annular guard plate carried by said tubular extension and having a depending rim embracing the cultivator head, a support plate hinged to said housing for horizontal swinging movement, a rearwardly extending wheel holding arm pivoted to said support plate for vertical swinging movement, said wheel holding arm being terminally bifurcated, a supporting wheel journaled on the bifurcated end of said wheel holding arm and forming the sole supporting means for the rear of the cultivator head, means for raising and lowering the wheel holding arm, and resilient means urging the wheel holding arm to a position co-axial with the tubular arm.

9. A farm implement comprising a housing, a vertical shaft journaled in said housing, a rotary cultivator head on said shaft, a tubular arm projecting from the housing, a brace arm fixed to said tubular arm, means swingably and adjustably securing said brace arm to the drawbar of a tractor for vertical and horizontal swinging movement of the housing, a drive shaft mounted in said tubular arm for rotation, a drive connection between said drive shaft and said vertical shaft, means operatively connecting the drive shaft to the power take-off of a tractor, a tubular extension depending from the housing, an annular guard plate carried by said tubular extension and having a depending rim embracing the cultivator head, a support plate hinged to said housing for horizontal swinging movement, a rearwardly extending wheel holding arm pivoted to said support plate for vertical swinging movement, said wheel holding arm being terminally bifurcated, a supporting wheel journaled on the bifurcated end of said wheel holding arm and forming the sole supporting means for the rear of the cultivator head, means for raising and lowering the wheel holding arm, a first bracket secured to said housing, a second bracket secured to said support plate, a spring member terminally secured to said first and second brackets and yieldingly retaining said wheel holding arm and said tubular arm co-axial with respect to each other, and means limiting the swinging movement of the support plate.

10. The combination of claim 9, wherein said means limiting the swinging movement of the support plate includes a threaded rod pivoted to said second bracket, said first bracket having an opening slidably receiving said threaded rod, and an abutment threaded on said rod and adapted to engage the first bracket upon predetermined swinging movement of said support plate.

GRANT HILTON DAYTON.

REFERENCES CITED

The following references are of record in the file of this patent:

UNITED STATES PATENTS

| Number | Name | Date |
|---|---|---|
| D. 145,438 | Goodall | Aug. 20, 1946 |
| 542,587 | Ferrill | July 9, 1895 |
| 1,208,856 | Storey | Dec. 19, 1916 |
| 1,513,678 | Spire | Oct. 28, 1924 |
| 1,613,596 | Altgelt | Jan. 11, 1927 |
| 1,659,234 | Boda | Feb. 14, 1928 |
| 2,193,157 | Ayo | Mar. 12, 1940 |
| 2,230,766 | Smith | Feb. 4, 1941 |

FOREIGN PATENTS

| Number | Country | Date |
|---|---|---|
| 431,987 | France | Sept. 25, 1911 |
| 542,111 | France | May 12, 1922 |
| 381,504 | Great Britain | Oct. 6, 1932 |
| 108,038 | Australia | Aug. 3, 1939 |